(12) United States Patent
Kobayashi et al.

(10) Patent No.: US 7,611,059 B2
(45) Date of Patent: Nov. 3, 2009

(54) CODE READING DEVICE AND PROGRAM

(75) Inventors: Yoshinobu Kobayashi, Tachikawa (JP); Kumiko Oono, Ome (JP); Toshihide Fujii, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 581 days.

(21) Appl. No.: 11/153,634

(22) Filed: Jun. 15, 2005

(65) Prior Publication Data
US 2005/0279832 A1    Dec. 22, 2005

(30) Foreign Application Priority Data
Jun. 16, 2004    (JP)    ............... 2004-177833

(51) Int. Cl.
*G06K 7/10*    (2006.01)
(52) U.S. Cl. ............ 235/462.07; 235/462.08; 235/462.41; 235/454; 235/469; 235/473
(58) Field of Classification Search ............ 235/462.07, 235/462.08, 462.41, 454, 469, 473
See application file for complete search history.

(56) References Cited

U.S. PATENT DOCUMENTS 5,192,854 A * 3/1993 Counts ....................... 235/375
2003/0089775 A1 * 5/2003 Yeakley et al. ............... 235/454
2006/0226227 A1 * 10/2006 Murata et al. ............... 235/454
2007/0051814 A1 * 3/2007 Ehrhart et al. ......... 235/462.08

FOREIGN PATENT DOCUMENTS

| JP | 5-314299 A | 11/1993 |
| JP | 2001-028033 A | 1/2001 |
| JP | 2004-110670 A | 4/2004 |

* cited by examiner

*Primary Examiner*—Allyson N Trail
(74) *Attorney, Agent, or Firm*—Frishauf, Holtz, Goodman & Chick, P.C.

(57)    ABSTRACT

On a display window that displays code patterns that are read at a time, a code reading device allows the code pattern that is successfully decoded to be visually confirmed with ease. In a handy terminal, when an image scanner reads code patterns at a time in response to a trigger operation, a CPU performs decoding processes for each code pattern and determines whether the decoding processes have been successfully completed or not based on the decoding results so as to display an identifying mark indicating the determination result in association with the image of each code pattern.

6 Claims, 9 Drawing Sheets

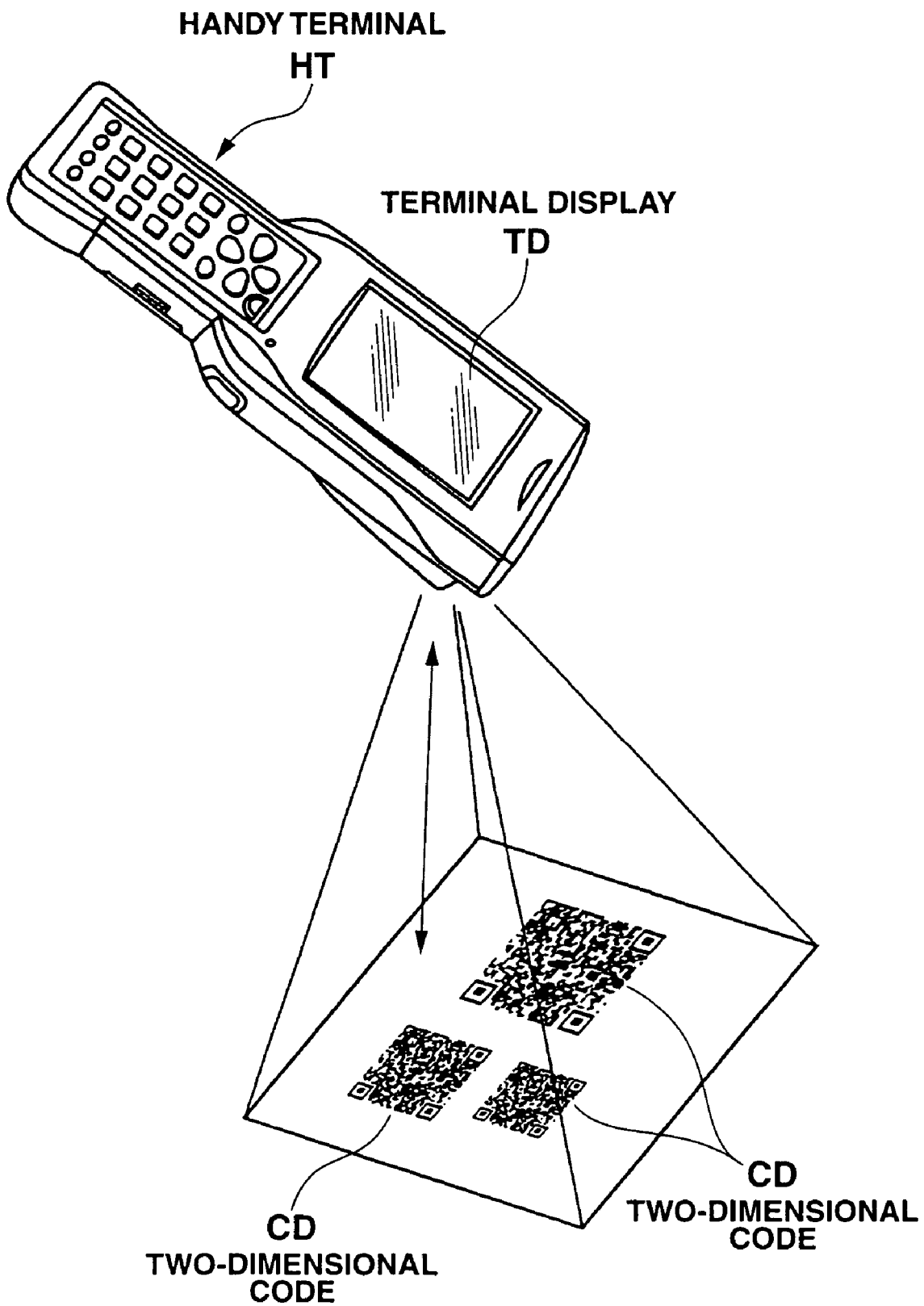

SELECT FOR DECODING

SELECT FOR NON-DECODING

DECODE OK

DECODE NG

HANDY TERMINAL

12 CODE LOCATION TABLE

| BAR CODE NUMBER | START POINT | END POINT | SELECT FOR DECODING | DECODING RESULT |
|---|---|---|---|---|
| 1 | X11,Y11 | X12,Y12 | 0 | 0 |
| 2 | X21,Y21 | X22,Y22 | 0 | 0 |
| 3 | X31,Y31 | X32,Y32 | 0 | 0 |

0: UNSELECT
1: SELECT FOR DECODING
2: SELECT FOR NON-DECODING

0: UNPROCESSED
1: OK
2: NG

CODE READING DEVICE AND PROGRAM

CROSS-REFERENCE TO RELATED APPLICATIONS

This application is based upon and claims the benefit of priority from prior Japanese Patent Application No. 2004-177833, filed Jun. 16, 2004, the entire contents of which are incorporated herein by reference.

BACKGROUND OF THE INVENTION

1. Field of the Invention

The present invention relates to a code reading device and a program that read out a code pattern such as a bar code or two-dimensional code and decode the read out code pattern, as well as display the decoding result.

2. Description of the Related Art

Various types of code reading devices (or bar code scanner) that read out the bar code printed and recorded on commodities have been proposed and put into practical use. For example, there are a laser beam scanner, an image capture scanner provided with a CMOS or CCD image sensor, a digital still camera scanner provided with a CCD or CMOS image sensor, and the like. In the case where these types of scanners are used, for a scanning method which can read a plurality of bar code labels at a time with a single scanning operation, there is available a scanning method in which the same data is prevented from being processed redundantly based on counter data and time data that have been recorded in association with the read out bar codes during the reading operation performed by irradiating the bar code labels with a laser beam and receiving the reflected light thereof.

In this scanning method, however, reading of a plurality of bar codes at a time with a single scanning operation is realized by preventing the redundant processes for the same data, in which all of the plurality of bar codes are to be read out.

The image capture scanner provided with a CMOS image sensor can read out a plurality of code patterns (bar code, two-dimensional code) at a time with a single scanning operation, in which the scanner sequentially performs decoding processes for each code pattern while analyzing the image data that has been read out at a time so as to output and display the decoding result, thereby significantly increasing workability. In this case, if the code pattern has not been decoded successfully, the next code pattern in the image data is designated for decoding. Therefore, there is a possibility to misidentify the correspondence between the code pattern and decoding result. The same applies to the case where the scanner reads out code patterns including those that are not to be read, because all the code patterns in the image data are to be decoded.

BRIEF SUMMARY OF THE INVENTION

An object of the present invention is to easily confirm the code pattern that has been decoded successfully on a display window that displays a plurality of code patterns that have been read out at a time.

Another object of the present invention is, on a display window for displaying a plurality of code patterns that have been read out at a time, to allow a user to easily distinguish between a code pattern that has been arbitrarily selected as a decoding target and another code pattern that has been arbitrarily selected as one that is not to be decoded, as well as to display the decoding result of a desired code pattern.

According to an embodiment of the present invention, a code reading device which reads a code pattern, decodes the read code pattern, and displays a decoding result, comprises:

a decoding processor, when code patterns are read at a time in response to a code reading instruction, which decodes each code pattern and determines whether the each code pattern is successfully decoded or not based on a decoding result; and a display device, when the decoding processor determines whether the each code pattern is successfully decoded or not, which displays a determination result in association with an image of the each code pattern.

According to another embodiment of the present invention, there is provided a program for allowing a computer to realize a function of:

when code patterns are read at a time in response to a code reading instruction, decoding each code pattern and determining whether the each code pattern is successfully decoded or not based on a decoding result; and when the decoding processor determines whether the each code pattern is successfully decoded or not, displaying a determination result in association with an image of the each code pattern.

The code pattern may comprise a bar code or two-dimensional code printed on a label or commodity. The contents and the format or type of the code are not limitative.

According to another embodiment of the present invention, the display device displays an identifying mark indicating the determination result in association with the image of the each code pattern.

According to another embodiment of the present invention, the code reading device further comprises:

a selector, on a display window that displays images of the code patterns that are read at a time, which selects whether which of the code patterns is selected as a decoding target or not; and a notification device, on the display window, which notifies whether which of the code patterns is selected as a decoding target or not in association with the image of each code pattern, and wherein the decoding processor decodes each code pattern that is selected as the decoding target by the selector and determines whether the each code pattern is successfully decoded or not based on the decoding result.

According to another embodiment of the present invention, a code reading device which reads a code pattern, decodes the read code pattern, and displays a decoding result, comprises:

a code pattern display device, when code patterns are read at a time in response to a code reading instruction, which displays the code patterns;

a selector, on a display window that displays images of the code patterns that are read at a time, which selects whether which of the code patterns is selected as a decoding target or not;

a notification device, on the display window, which notifies whether which of the code patterns is selected as a decoding target or not in association with an image of each code pattern; and a decoding processor which decodes the code pattern that is selected as the decoding target by the selector when receiving a decode instruction after the notification device notifies whether which of the code patterns is selected as a decoding target or not and the decoding processor displays a decoding result.

According to another embodiment of the present invention, there is provided a program for allowing a computer to realize a function of:

when code patterns are read at a time in response to a code reading instruction, displaying the code patterns;

selecting whether which of the code patterns is selected as a decoding target or not on a display window that displays images of the code patterns;

when whether which of the code patterns is selected as the decoding target or not is selected, displaying whether which of the code patterns is selected as the decoding target or not in association with the image of each code pattern, on a display window that displays the code patterns; and decoding the code pattern that is selected as the decoding target when receiving a decode instruction after notifying whether which of the code patterns is selected as a decoding target or not and displaying a decoding result.

According to another embodiment of the present invention, the notification device displays an identifying mark indicating whether which of the code patterns is selected as a decoding target or not in association with an image of each code pattern.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 1 is a perspective view showing a handy terminal HT which scans a plurality of two-dimensional code patterns at a time;

DETAILED DESCRIPTION OF THE INVENTION

An embodiment of a code reading device according to the present invention will now be described with reference to the accompanying drawings.

FIG. 1 is a perspective view showing a handy terminal HT according to the embodiment, the handy terminal HT being scanning a plurality of two-dimensional code patterns CD at a time. In this drawing, the handy terminal HT scans three adjacently-located two-dimensional code patterns CD at a time.

The handy terminal HT is provided with an image capture scanner or a digital still camera scanner provided with a CCD or CMOS image sensor to optically read out a code pattern such as a bar code or two-dimensional code (e.g., "PDF417 code" "QR code"). The handy terminal HT may be provided with a laser beam scanner.

By operating a trigger key (scan start switch), the image scanner starts an optical reading of a plurality of two-dimensional code patterns CD recorded on labels or commodities. The area denoted by a triangular pyramid in FIG. 1 is an effective area that the image scanner can read out with a single scanning operation. In this case, the data within the effective area that has been read out with a single scanning operation, that is, image data (scan data) corresponding to one surface on the area sensor is displayed as an image on a terminal display TD. At the same time, the area of the image data is specified for each code pattern CD. The specified data is then subjected to a decoding process after being cut out, digitized, distortion-corrected and the like.

The handy terminal HT according to the present embodiment is synthesizing/displaying a predetermined identifying mark in association with an displayed image of each code pattern on the terminal display TD that displays a plurality of code patterns CD that have been read at a time in order to allow identification of whether the displayed code pattern is the one that has been decoded successfully or not and whether the displayed code pattern is the one that has been arbitrarily selected as a decoding target or not.

In the embodiment, a graphic data file (not shown) is provided to store and manage four identifying marks (to be described later). The identifying mark that has selectively been read out is then associated with an image display of each code pattern for the display for a user.

FIGS. 2A to 2D are views for explaining identifying marks that are synthesized/displayed in association with displayed images of a plurality of code patterns that have been read out at a time. The hatched rectangular area is an image display area of the code pattern CD.

Figure 2A:
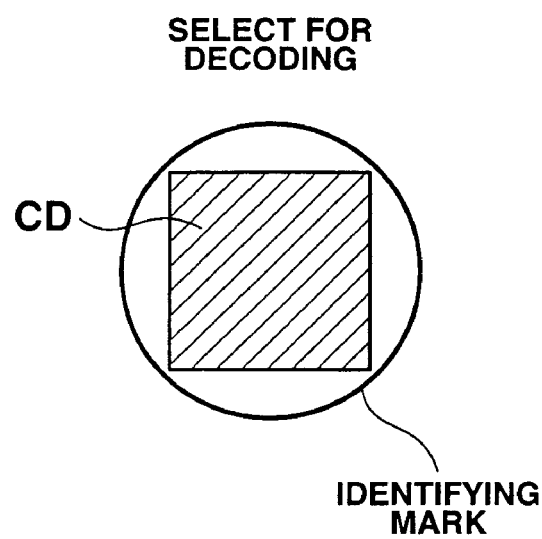
FIGS. 2A to 2D are views for explaining an identifying mark that is synthesized/displayed in association with displayed images of a plurality of code patterns that have been read out at a time.
Figure 2B:
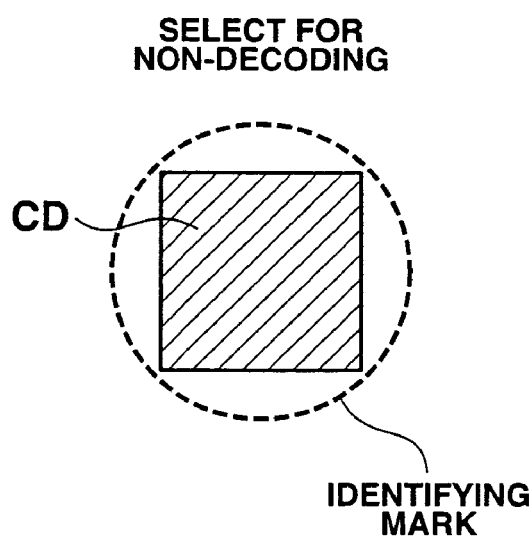
Figure 2C:
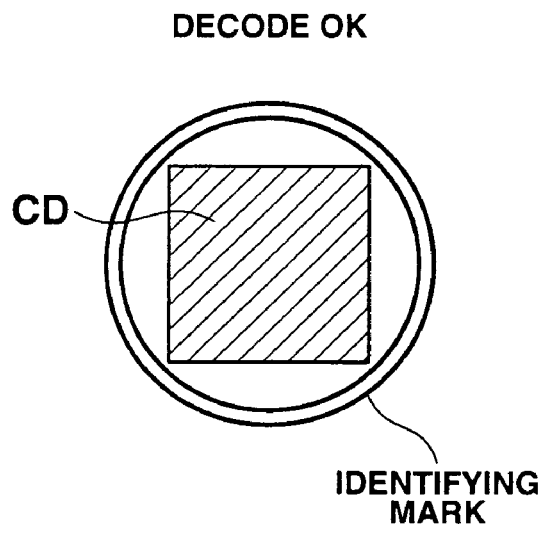
Figure 2D:
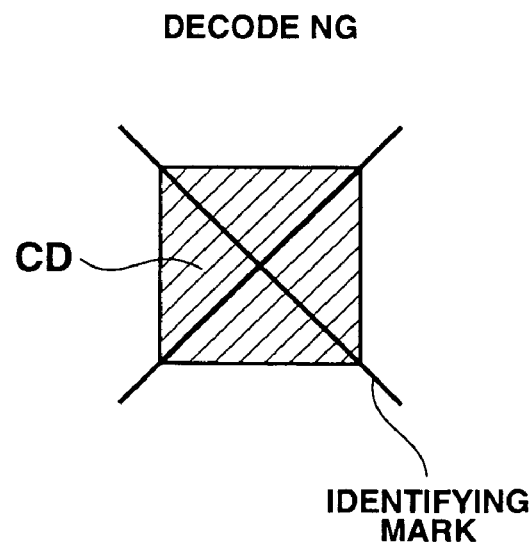

FIG. 2A shows an identifying mark (circle mark defined by a solid line) that is synthesized/displayed in association with a displayed image of the code pattern that has been arbitrarily selected as a decoding target. FIG. 2B is an identifying mark (circle mark defined by a broken line) for the code pattern to be selected as a non-decoding target. FIG. 2C shows an identifying mark (double circle mark) for the code pattern that has been decoded successfully. FIG. 2D is an identifying mark (cross mark) for the code pattern that has not been decoded successfully.

Before describing the characterizing portion of the embodiment in greater detail, it will be useful to describe the hardware configuration of the embodiment.

Figure 3:
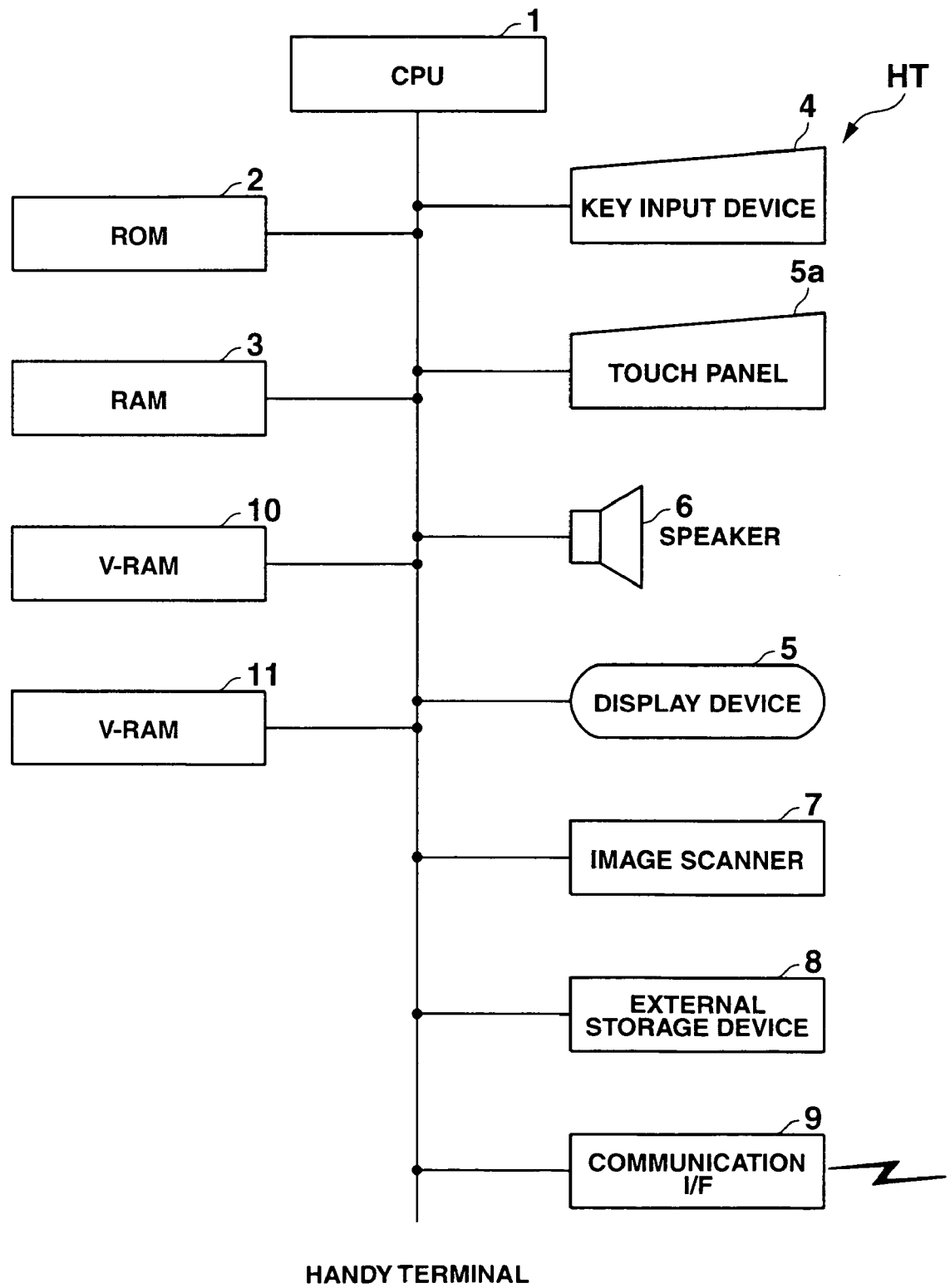
FIG. 3 is a block diagram showing major components of the handy terminal HT shown in FIG. 1.

FIG. 3 is a block diagram showing major components of the handy terminal HT.

Figure 6:
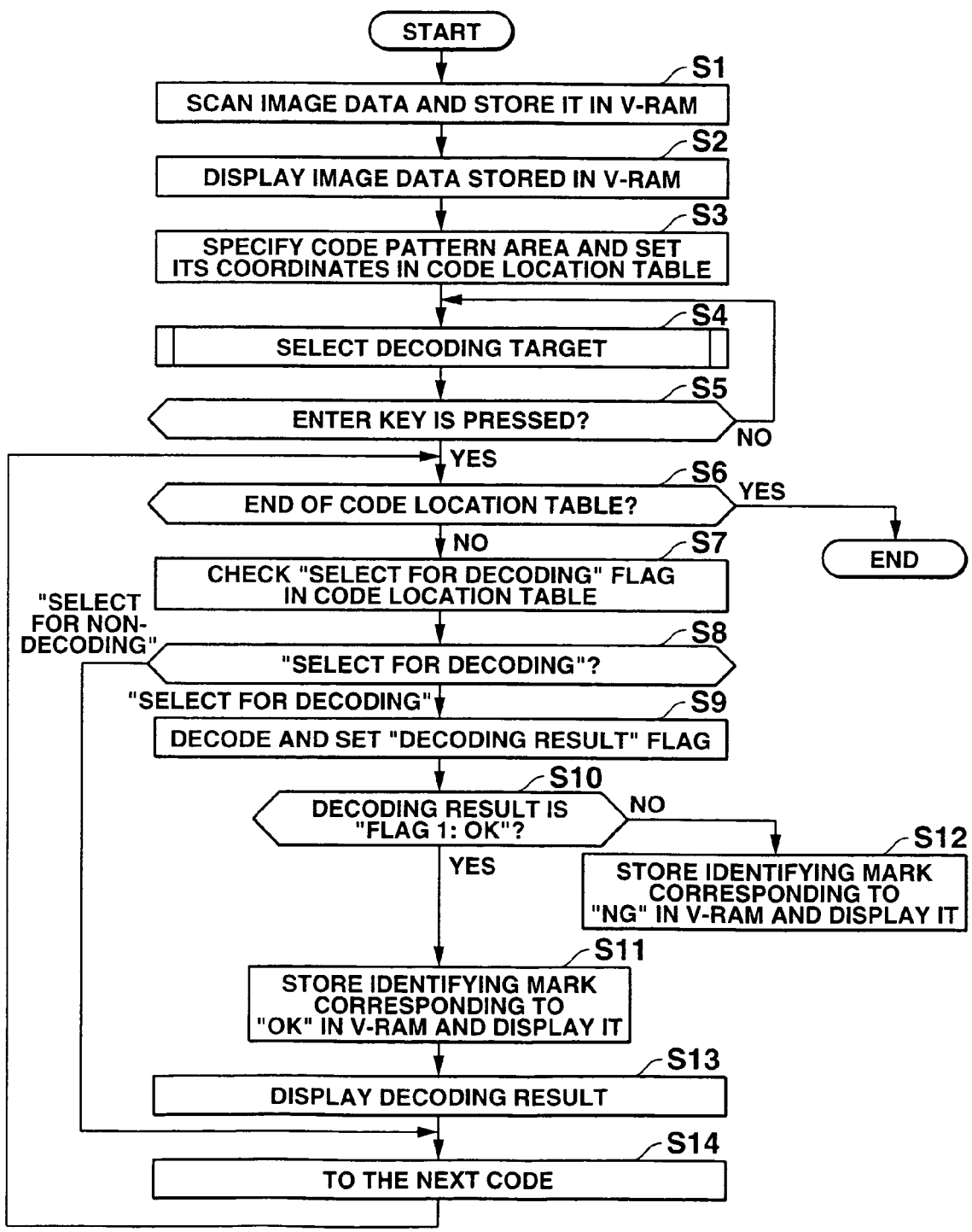
FIG. 6 is a main flowchart showing the entire operation of the handy terminal HT shown in FIG. 1, the operation being started when a trigger key (scan start switch) is operated.
Figure 7:
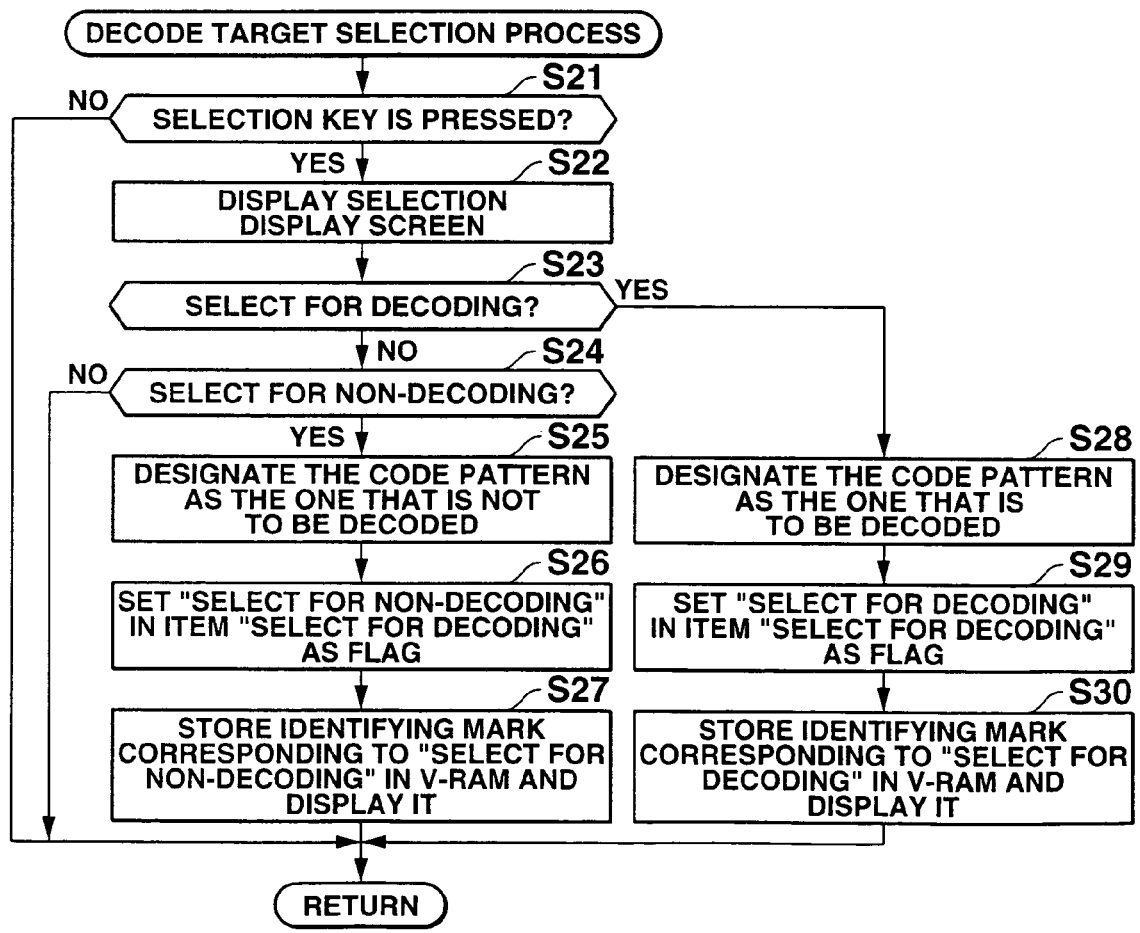
FIG. 7 is a flowchart showing in detail a selection process (step S4) shown in FIG. 6 for determining whether which of the code patterns is selected as a decoding target or not.

A CPU 1 is a central processing unit that controls the entire operation of the handy terminal HT in cooperation with an operating system and various application software stored in a ROM 2. An application program for carrying out the present embodiment according to the operational procedures (to be described later) shown in FIGS. 6 and 7 is stored in the program area within the ROM 2. A RAM 3 includes a program execution area and data area, the data area storing a code location table 12 (to be described later). Connected through a bus line to the CPU 1 are input/output devices, such as a key input device 4 which is an input/output peripheral device, a display device 5 with a touch panel 5*a*, a speaker 6, an image scanner 7, an external storage device 8, a communication I/F (interface) 9. The CPU 1 controls the operation of the above input/output devices according to an input/output program. The CPU 1 can access and download a program/data of another electronic device through the communication I/F 9.

The image scanner 7 is an image capture scanner that uses a CMOS sensor to read out a code pattern such as a bar code or two-dimensional code, as described above. The image scanner 7 can read out a plurality of two-dimensional code patterns recorded on a label or the like with a single scanning operation. The image data (scan data) corresponding to one frame of the CMOS sensor is written into a video RAM (V-RAM) 10 for code pattern and then displayed as an image. In this case, a V-RAM 11 for identifying mark is provided in order to synthesize/display the identification mark for specifying whether the displayed code pattern is the one that has been decoded successfully or not in association with a displayed image of each code pattern, or for specifying whether the displayed code pattern is the one that has been selected as a decoding target or not in association with a displayed image of each code pattern, on a display window that displays a plurality of code patterns as images.

Figure 4:
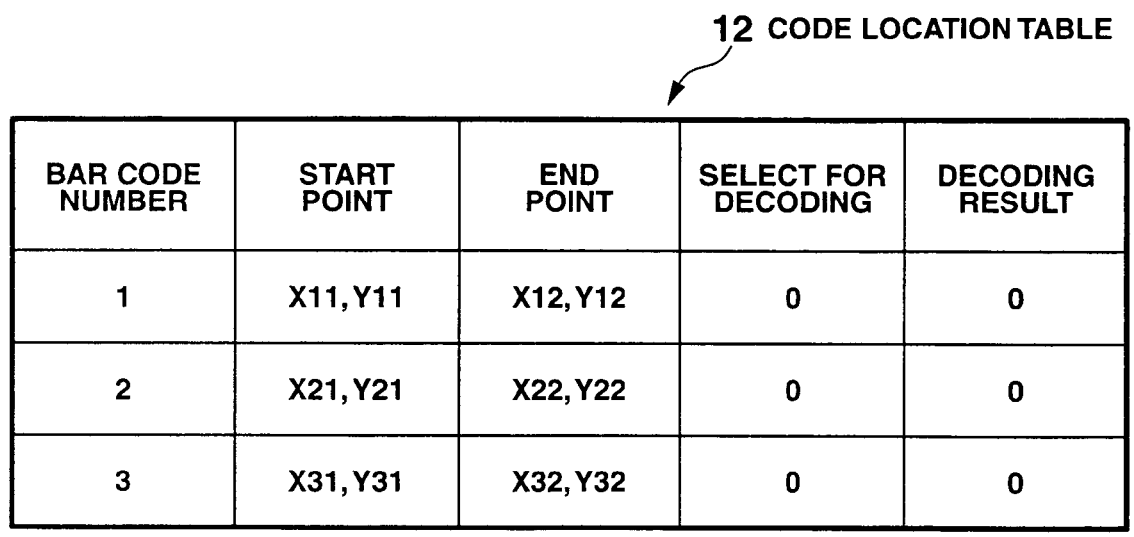
FIG. 4 is a view showing contents of a code location table 12.

FIG. 4 is a view showing contents of the code location table 12 stored in the RAM 3.

Figure 5:
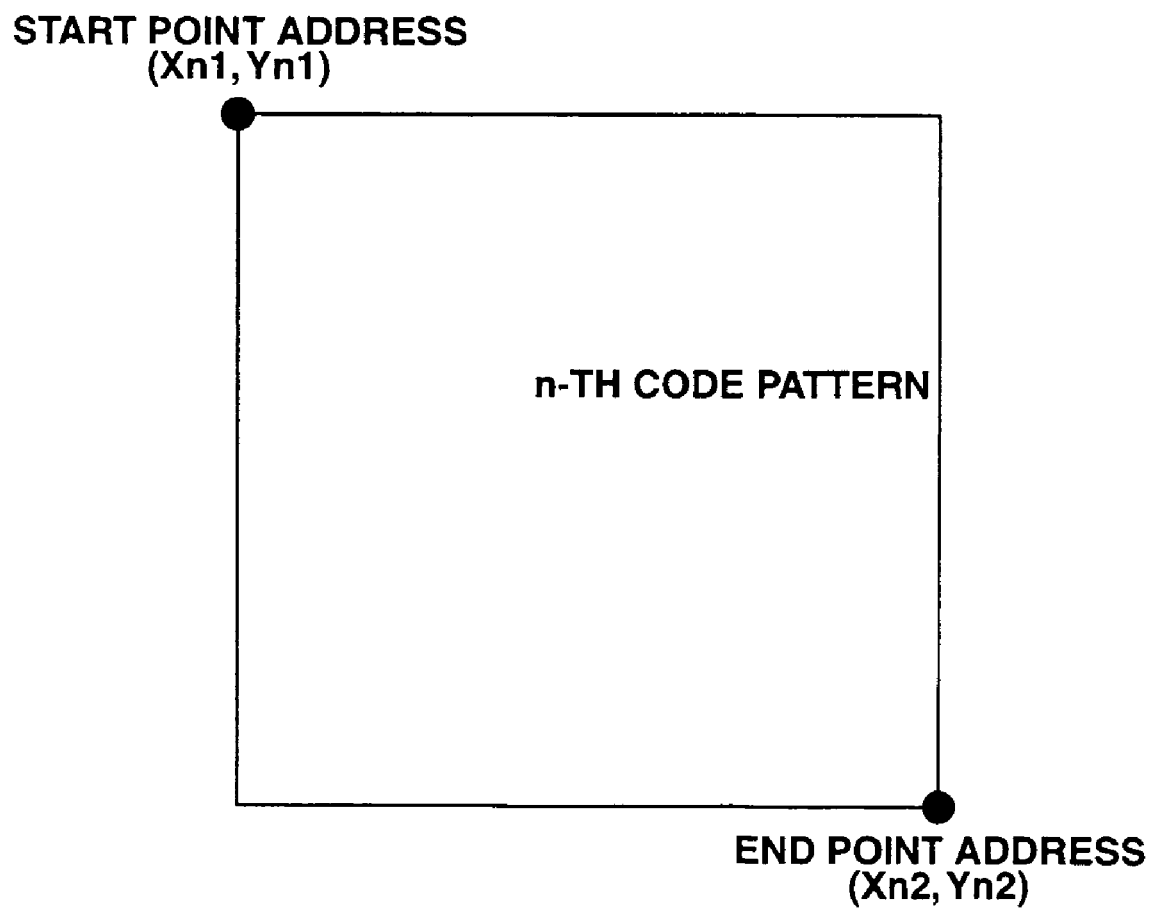
FIG. 5 is a view for explaining that a code pattern area is defined by a start-point address (upper-left position) and an end-point address (lower-right position) of the code pattern area.

The code location table 12 is provided for storing and managing information and the like that have been obtained by analyzing the area locations for each code pattern within the image data of one frame. The code location table 12 has, in correspondence with "BAR CODE NUMBER", items of "START POINT" and "END POINT", as well as items of "SELECT FOR DECODING" and "DECODING RESULT". The item "BAR CODE NUMBER" is a serial number automatically created every time a code pattern area is designated among the image data of one frame. The items "START POINT" and "END POINT" each represent the location of a code pattern area by a two-dimensional coordinate system with a predetermined location within the image data of one frame as a reference. In FIG. 5, "START POINT" defines the upper-left location of a code pattern area as the start-point address (Xn1, Yn1), and "END POINT" defines the lower-right location of a code pattern area as the end-point address (Xn2, Yn2).

The item "SELECT FOR DECODING" is the item in which a status flag indicating whether the code pattern has been arbitrarily selected as a decoding target or not is set on a terminal display TD that displays a plurality of code patterns that have been read out at a time as an image. "0", "1", or "2" is set as the flag. In this case, the flags "0", "1", and "2" indicate "UNSELECT", "SELECT FOR DECODING", and "SELECT FOR NON-DECODING", respectively. More specifically, "flag 0: UNSELECT" indicates the initial state in which a selection operation for selecting a decoding target has not been performed, "flag 1: SELECT FOR DECODING" indicates that the corresponding code pattern has been selected as a decoding target, and "flag 2: SELECT FOR NON-DECODING" indicates that the corresponding code pattern is not to be decoded. When the flag "1" is set in the item "SELECT FOR DECODING", the CPU 1 decodes the corresponding code pattern. When the flag "2" is set in the item, the CPU 1 skips decoding of the corresponding code pattern.

The item "DECODING RESULT" is the item in which a status flag indicating whether the corresponding code pattern has been decoded successfully or not is set after decoding of the code pattern has been completed. "0", "1", or "2" is set as the flag. In this case, the flags "0", "1", and "2" indicate "UNPROCESSED", "OK", and "NG", respectively. More specifically, "flag 0: UNPROCESSED" indicates the initial state in which a decoding process has not been performed, "flag 1: OK" indicates that the corresponding code pattern has been decoded successfully, and "flag 2: NG" indicates that decoding of the corresponding code pattern has failed. Thus, the CPU 1 sets the "flag 1: OK" or "flag 2: NG" as "DECODING RESULT" based on whether the corresponding code pattern has been decoded successfully or not.

The aforementioned graphic data file stores four identifying marks associated with the contents of "SELECT FOR DECODING" and "DECODING RESULT". That is, the identifying mark of FIG. 2A (circle mark defined by a solid line) is stored in association with "flag 1: SELECT FOR DECODING", the identifying mark of FIG. 2B (circle mark defined by a broken line) is stored in association with "flag 2: SELECT FOR NON-DECODING", the identifying mark of FIG. 2C (double circle mark) is stored in association with "flag 1: OK", and the identifying mark of FIG. 2D (cross) is stored in association with "flag 2: NG". In this case, each of the identifying marks may be a vector font as well as a bit map image data.

The operation concept of the handy terminal HT according to the embodiment will next be described with reference to the flowcharts of FIGS. 6 and 7. Respective functions described in these flowcharts are stored in the form of computer-readable program codes, and respective operations are sequentially executed according to the program codes. Further, respective operations may be sequentially executed according to the program codes that have been transmitted from an external device through a transmission medium. That is, it is possible to execute the operations specific to the present embodiment using programs/data supplied from an external device through a transmission medium, in addition to programs/data stored in the storage medium.

FIG. 6 is a flowchart showing the entire operation of the handy terminal HT, the operation being started when a trigger key (scan start switch) is operated.

First, the CPU 1 optically reads out a plurality of two-dimensional code patterns recorded on labels or the like and stores image data (scan data) of one frame in the V-RAM 10 for code pattern (step S1). The image data that has been stored in the V-RAM 10 is displayed as an image on the terminal display TD that constitutes the display device 5 with the touch panel 5*a* (step S2). In this case, the image data of one frame is directly displayed as an image, so that a plurality of code patterns that have been read out with a single scanning operation are displayed as an image with the actual arrangement without change.

The CPU 1 then analyzes the image data of one frame to sequentially specify the area of the each code pattern included in the image data to thereby specify the start point coordinate and end point coordinate of each code pattern area and sets the start and end point coordinates in the code location table 12 as "START POINT" and "END POINT" in association with "BAR CODE NUMBER" (step S3). In this case, every time the code pattern area is specified, the CPU 1 repeats the operation of automatically creating "BAR CODE NUMBER", creating a new record including the created "BAR CODE NUMBER" and setting the start and end point coordinates of the code pattern area in the created record as "START POINT" and "END POINT".

After the process of setting the location information related to a plurality of code patterns that have been read with a single scanning operation in the code location table 12 has been completed as described above, the operation flow shifts to a selection process, in which the CPU 1 receives a selection operation specifying whether the displayed code pattern is a decoding target or not and displays the selected state in a visually understandable manner (step S4).

Figure 8:
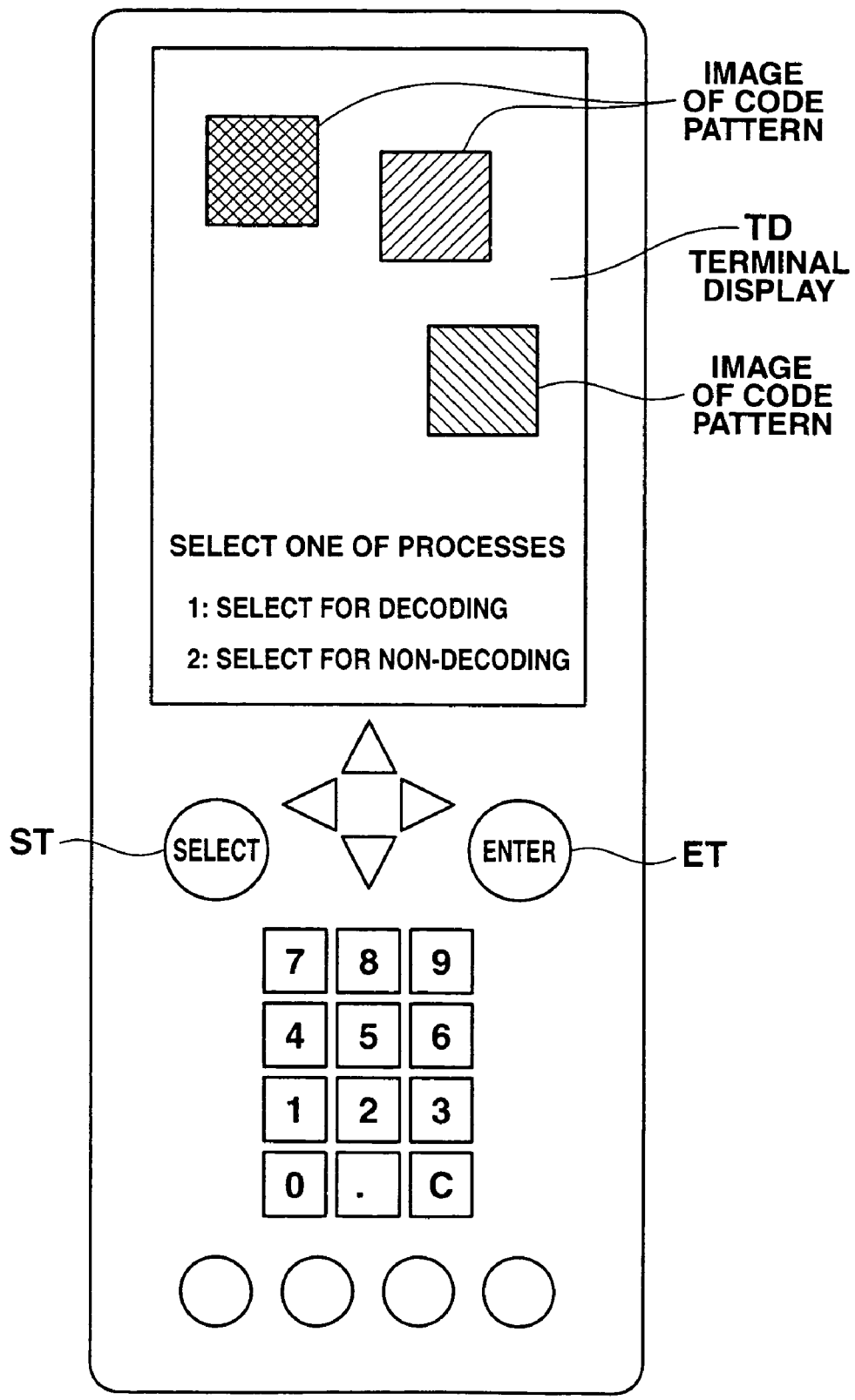
FIG. 8 is a view showing a selection display window.

FIG. 7 is a flowchart showing in detail a selection process (step S4) shown in FIG. 6 for determining whether which of the code patterns is selected as a decoding target or not. FIG. 8 shows a selection display window.

When a selection key ST (FIG. 8) is operated (step S21), the CPU 1 first allows a selection display window to be output/displayed in response to the key operation (step S22). That is, as shown in FIG. 8, in a state where a plurality of code patterns are displayed as an image on the terminal display TD that constitutes the display device 5 with the touch panel 5*a*, an operation menu for decode selection is output/displayed as a selection display. When one of the menu items "1: SELECT FOR DECODING" and "2: SELECT FOR NON-DECODING" is designated, it is determined whether "1: SELECT FOR DECODING" has been designated or not in step S23.

When "1: SELECT FOR DECODING" has been designated (YES in step S23) and the displayed location of the corresponding code pattern is touched and designated for the selection as a decoding target on the terminal display TD (step S28), the CPU 1 detects the touched location (code pattern location) and searches the code location table 12 based on the detected location to specify the record corresponding to the detected location, thereby setting the flag "1" indicating that the corresponding code pattern is a decoding target in the item "SELECT FOR DECODING" within the designated record (step S29). The CPU 1 then reads out the identifying mark (circle mark defined by a solid line) corresponding to "1: SELECT FOR DECODING" from the graphic data file and stores the identifying mark in the V-RAM 11 for identifying mark with the location of the designated code pattern as a reference, thereby synthesizing/displaying the identifying mark in association with the displayed image of the designated code pattern (step S30). In this case, the designated code pattern is surrounded by the solid line circle mark.

When "2: SELECT FOR NON-DECODING" has been designated (YES in step S24) and the displayed location of the corresponding code pattern is touched and designated for the selection as the one that is not to be decoded on the terminal display TD (step S25), the CPU 1 detects the touched location (code pattern location) and searches the code location table 12 based on the detected location to specify the record corresponding to the detected location, thereby setting the flag "2" indicating that the corresponding code pattern is not a decoding target in the item "SELECT FOR DECODING" within the designated record (step S26).

The CPU 1 then reads out the identifying mark (circle mark defined by a broken line) corresponding to "flag 2: SELECT FOR NON-DECODING" from the graphic data file and stores the identifying mark in the V-RAM 11 for identifying mark with the location of the designated code pattern as a reference, thereby synthesizing/displaying the identifying mark in association with the displayed image of the designated code pattern (step S27). Also in this case, the designated code pattern is surrounded by circle mark defined by the broken line.

When an enter key (a key for determining the selected content, in other words, a key for starting a decoding process) ET shown in FIG. 8 is operated after the above selection process has been completed (step S5 in FIG. 6), the CPU 1 sequentially reads out the contents in the code location table 12 for each record from the beginning. At this time, the CPU 1 checks whether all the records up to the final record have been read out in step S6. When the non-final record has been read out in step S6, the CPU 1 checks the flag set in the "SELECT FOR DECODING" in the record (step S7). When the flag indicates "flag 2: SELECT FOR NON-DECODING", the CPU 1 reads out the next record (step S14).

On the other hand, when the flag indicates "flag 1: SELECT FOR DECODING", the CPU 1 cuts out the code pattern from the area defined by "START POINT" and "END POINT" within the record to decode the cut out code pattern and checks whether the code pattern has been decoded successfully. When the code pattern has been decoded successfully, the CPU 1 sets "flag 1: OK" as "DECODING RESULT" in the record. When the decoding of the code pattern has failed, the CPU 1 sets "flag 2: NG" (step S9).

In this case, when the decoding result is "flag 1: OK", (YES in step S10), the CPU 1 reads out the identifying mark (double circle mark) corresponding to "flag 1: OK" from the graphic data file and stores the identifying mark in the V-RAM 11 for identifying mark with the location of the designated code pattern as a reference, thereby synthesizing/displaying the identifying mark in association with the displayed image of the designated code pattern (step S11). In this case, the designated code pattern is surrounded by the double circle mark. After that, the decoding result obtained by the normal decoding process is output and displayed (step S13).

when the decoding result is "flag 2: NG", (No in step S10), the CPU 1 reads out the identifying mark (cross) corresponding to "flag 2: NG" from the graphic data file and stores the identifying mark in the V-RAM 11 for identifying mark with the location of the designated code pattern as a reference, thereby synthesizing/displaying the identifying mark in association with the displayed image of the designated code pattern (step S12). In this case, the designated code pattern is superposed by the cross mark.

Thereafter, the CPU 1 reads out the next record from the code location table 12 (step S14) and repeats the aforementioned operation (steps S6 to S14) until all the records up to the final record have been read out (YES in step S6).

Figure 9:
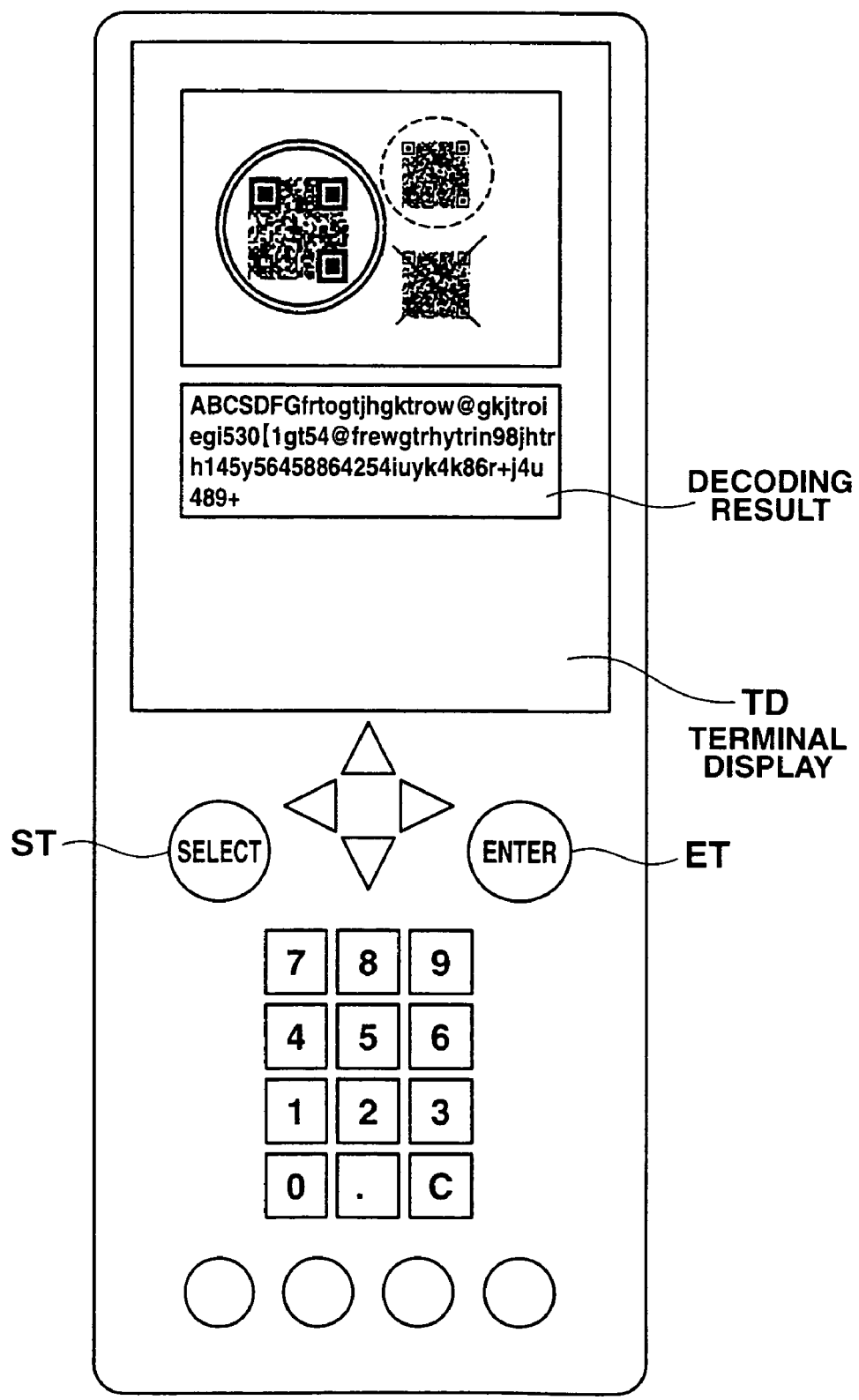
FIG. 9 is a view showing the selection display window at the end of the decoding.

FIG. 9 is a view showing a display content at the end of the decoding.

The following states can be confirmed visually by the identifying marks displayed in association with the displayed images of respective code patterns. That is, it can be confirmed that the code pattern surrounded by the double circle mark is a code pattern that has been selected as a decoding target and has been decoded successfully. In this case, the displayed image of the code pattern and decoding result are arranged side by side with each other on the terminal display TD, so that it is possible to confirm that the displayed decoding result corresponds to the code pattern surrounded by the double circle mark.

Similarly, it can be confirmed that the code pattern surrounded by the dotted circle mark is a code pattern that has been selected as a code pattern that is not to be decoded.

Further, it can be confirmed that the code pattern surrounded by the cross mark is a code pattern that has been selected as a decoding target but has not been decoded successfully.

As described above, in the handy terminal HT according to the present embodiment, when the image scanner 7 reads out a plurality of code patterns at a time in response to a trigger operation, the CPU 1 performs decoding processes for each code pattern, determines whether the code patterns have been decoded successfully based on the decoding results, and displays the determined state in association with the displayed images of respective code patterns in such a manner that a user can visually understand the determined state. Therefore, it is possible to easily confirm the code patterns that have been decoded successfully on the display window that displays a plurality of code patterns that has been read out at a time as an image, effectively preventing the correspondence between the code pattern and decoding result from being misidentified.

In this case, when whether which of the code patterns has been selected as a decoding target or not is arbitrarily specified on the display window that displays a plurality of code patterns that has been read out at a time as an image, the selected determination is displayed in association with the displayed image of the code pattern in such a manner that a user can visually understand the determination. Therefore, it is possible to easily confirm the code pattern that has been arbitrarily selected as a decoding target. At the same time, the following three types of identifications are possible after the decoding process has been completed. That is, it is possible to identify the code pattern that has been selected as a decoding target and that has been decoded successfully, the code pattern that has been selected as the one that is not to be decoded, and the code pattern that has been selected as a decoding target and that has not been decoded successfully.

Further, when whether which of the code patterns has been selected as a decoding target or not is arbitrarily specified, the identifying marks indicating the specification and those indicating whether the code patterns have been decoded successfully or not are displayed in association with respective code patterns. With this configuration, it is possible to intuitively confirm whether the decoding process has been completed successfully or not. Further, by selectively using the four identifying marks, various states can be displayed to a user.

In the handy terminal HT according to the present embodiment, when the image scanner 7 reads out a plurality of code patterns at a time in response to a trigger operation, the CPU 1 displays the code patterns as an image. Further, when whether which of the code patterns has been selected as a decoding target or not is arbitrarily specified on the display window that displays a plurality of code patterns as an image, the specified result is displayed in association with the displayed image of the code pattern in such a manner that a user can visually understand the specified result. With this configuration, the code pattern that has been arbitrarily selected as a decoding target or the one that is not to be decoded can be easily confirmed on the display window that displays a plurality of code patterns that has been read out at a time as an image. In this case, the CPU 1 decodes the code pattern that has been selected as a decoding target and displays the decoding result thereof. Therefore, in the case where the scanner has read out code patterns including those that are not to be read out, the user does not misidentify the decoding result since only the decoding result of a desired code pattern is displayed.

The above embodiment is based on the case where a plurality of code patterns have been read out by the image scanner 7 at a time. However, there may also be a case where only one code pattern has been read out. When the process in which a plurality of code patterns have been read out has been detected after automatically determining whether one code pattern has been readout or a plurality of code patterns have been read out, a predetermined identifying mark may be synthesized/displayed in association with the displayed image of each code pattern. In this case, the number of the code patterns included in the image data is calculated by analyzing image data obtained by one scanning operation.

The example of FIG. 9 shows the case where the number of the double-circled code patterns (that is, the code pattern that has been selected as a decoding target and that has been decoded successfully) is one. However, there may also be a case where the number of the double-circled code patterns is two or more. In this case, in order to specify that a decoding result currently displayed corresponds to which of the double-circled code patterns, the double circle mark that surrounds the corresponding code pattern may be blinked. In this case, it is possible to switch the window in order to display the next decoding result in response to a switch operation and to switch the blinking display of the double-circled mark in conjunction with the switch of the decoding result.

While both of "SELECT FOR DECODING" and "SELECT FOR NON-DECODING" are displayed on the selection display in the above embodiment (FIG. 8), it is possible to display one of them to select one of the code pattern which is the decoding target and the code pattern which is not the decoding target.

While the circle mark defined by a solid line, circle mark defined by a broken line, double circle mark, and cross mark are displayed as an identifying mark in a synthesized manner in the above embodiment, any shape may be used for the identifying mark. In addition, the location of the identifying mark may be arbitrarily set and the identifying mark may be positioned above or below the corresponding code pattern as long as the correspondence between the two can be indicated clearly.

Further, the identifying means is not limited to the identifying mark synthesized and displayed in association with the corresponding code pattern. Alternatively, however, the code pattern itself may be blinked or the brightness of the code pattern itself may be changed for the identification. Further, only the code pattern that has been decoded successfully or that has been selected as a decoding target may be displayed. Contrary, the code pattern that has not been decoded successfully or that has been selected as the one that is not to be decoded may be displayed.

Further, the type of the scanner is not limited. In addition to the image capture scanner provided with a CMOS image sensor, a laser beam scanner, a digital still camera scanner provided with a CCD image sensor may be used. Moreover, not only a handy-type scanner but also a stationary type scanner may be adopted.

Further, components of the code reading device may be physically divided into two or more casings. In this case, the code reading device is configured to send/receive data through a wired transmission path such as a communication line and cable, or a wireless transmission path such as electromagnetic wave, microwave and infrared ray between the casings.

A recording medium (e.g., CD-ROM, flexible disk, RAM card and the like) storing program codes for allowing a computer to execute the above measures may be provided. More specifically, it is possible to provide a recoding medium storing computer-readable program codes that allows the computer to realize a function of: when a plurality of code patterns are read out at a time in response to a code reading instruction, performing decoding processes for each code pattern and specifying whether the decoding processes have been completed successfully based on the decoding results; and, when whether decoding processes performed for each code pattern have been completed successfully or not has been determined, displaying the determination result in association with the displayed image of each code pattern in such a manner that a user can visually understand the determination result.

Further, it is possible to provide a computer-readable storing medium storing program codes that allows the computer to realize a function of: when a plurality of code patterns are read out at a time in response to a code reading instruction, displaying code patterns as an image; when whether which of the code patterns has been selected as a decoding target or not is arbitrarily specified on the display window that displays a plurality of code patterns as an image, displaying the specified result in association with the displayed image of each code pattern in such a manner that a user can visually understand the specified result; and decoding the code pattern that has been selected as a decoding target when receiving a decode instruction after the display of the specified result and displaying the decoding result.

According to an embodiment of the present invention, when a plurality of code patterns have been read out at a time in response to a code reading instruction, the code reading device performs decoding processes for each code pattern, determines whether the code patterns have been decoded successfully based on the decoding result, and displays the determination results in association with the displayed images of respective code patterns in such a manner that a user can visually understand the determination result. Therefore, it is possible to easily confirm the code patterns that have been decoded successfully on the display window that displays a plurality of code patterns that have been read out at a time as an image, effectively preventing the correspondence between the code pattern and decoding result from being misidentified.

Further, according to the other embodiment of the present invention, when whether the decoding process has been completed successfully or not is displayed in association with the displayed image of each code pattern in a visually understandable manner, the identifying mark indicating whether the code patterns have been decoded successfully or not is displayed in association with the displayed image of each code pattern. With this configuration, it is possible to intuitively confirm whether the decoding process has been completed successfully or not.

Further, according to the other embodiment of the present invention, when whether which of the code patterns has been selected as a decoding target or not is arbitrarily selected on the display window that displays a plurality of code patterns that has been read out at a time as an image, the code reading device displays the selection result in association with the displayed image of the code pattern in such a manner that a user can visually understand the selection result, performs the decoding processes for each code pattern that has been selected as a decoding target, and determines whether the decoding processes have been completed successfully based on the decoding results. Therefore, it is possible to easily confirm the code pattern that has been arbitrarily selected as a decoding target or the code pattern that has been selected as a code pattern that is not to be decoded.

The following three types of identifications are possible after the decoding process has been completed. That is, it is possible to identify the code pattern that has been selected as a decoding target and that has been decoded successfully, the code pattern that has been selected as the one that is not to be decoded, and the code pattern that has been selected as a decoding target and that has not been decoded successfully.

In order to achieve the other object, according to the other embodiment of the present invention, when a plurality of code patterns have been read out at a time in response to a code reading instruction, the code reading device displays the code patterns as an image. Further, when whether which of the code patterns has been selected as a decoding target or not is arbitrarily selected on the display window that displays a plurality of code patterns as an image, the selection result is displayed in association with the displayed image of the code pattern in such a manner that a user can visually understand the selection.

With this configuration, the code pattern that has been arbitrarily selected as a decoding target or the one that is not to be decoded can be easily identified on the display window that displays a plurality of code patterns that has been read out at a time as an image. In this case, the code reading device decodes the code pattern that has been selected as a decoding target and displays the corresponding decoding result. Therefore, in the case where the scanner has read out code patterns including those that are not to be read out, the user does not misidentify the decoding result since only the decoding result of a desired code pattern is displayed.

Further, in order to achieve the other object, according to the other embodiment of the present invention, when whether which of the code patterns has been arbitrarily selected as a decoding target or not is displayed in association with the displayed image of each code pattern in a visually understandable manner, the identifying marks indicating whether which of the code patterns has been arbitrarily selected as a decoding target or not are displayed in association with respective code patterns. With this configuration, it is possible to intuitively confirm whether the corresponding code pattern is a decoding target or not.

What is claimed is:

1. A code reading device comprising:
a memory configured to store a first identification mark indicating that a code pattern is selected as a decoding target and a second identification mark indicating that a code pattern has been successfully decoded;
a code pattern display device which, when a plurality of code patterns are read at a time in response to a code reading instruction, displays images of the code patterns;
a selector which allows a user to arbitrarily select, on a display window that displays the images of the code patterns, whether or not each of the code patterns is selected as a decoding target;
a notification device which noticeably displays, based on a user selection via the selector, the first identification mark superimposed on the image of a code pattern that has been selected as a decoding target; and
a decoding processor which decodes each code pattern that has been selected as a decoding target when a decode instruction is received after the notification device noticeably displays the first identification mark, and which noticeably displays, based on a result of decoding, the second identification mark superimposed on the image of a code pattern that has been selected as a decoding target and has been successfully decoded.

2. The code reading device according to claim 1, wherein the memory is configured to store a third identification mark indicating that a code pattern is not selected as a decoding target; and
wherein the notification device noticeably displays the third identification mark superimposed on the image of a code pattern that has not been selected as a decoding target.

3. The code reading device according to claim 2, wherein the memory is configured to store a fourth identification mark indicating that a code pattern has not been successfully decoded; and
wherein the decoding processor noticeably displays, based on the result of decoding, the fourth identification mark superimposed on the image of a code pattern that has been selected as a decoding target and has not been successfully decoded.

4. A computer readable recording medium having a computer program stored thereon that is executable by a computer of a device comprising a memory configured to store a first identification mark indicating that a code pattern is selected as a decoding target and a second identification mark indicating that a code pattern has been successfully decoded, wherein the computer program is executable by the computer to cause the computer to perform functions comprising:

when a plurality of code patterns are read at a time in response to a code reading instruction, displaying images of the code patterns;

allowing a user to arbitrarily select, on a display window that displays the images of the code patterns, whether or not each of the code patterns is selected as a decoding target;

noticeably displaying, based on a user selection, the first identification mark superimposed on the image of a code pattern that has been selected as a decoding target;

decoding each code pattern that has been selected as a decoding target when a decode instruction is received after the first identification mark has been noticeably displayed; and noticeably displaying, based on a result of the decoding, the second identification mark superimposed on the image of a code pattern that has been selected as a decoding target and has been successfully decoded.

5. The computer readable recording medium according to claim 4, wherein the memory is configured to store a third identification mark indicating that a code pattern is not selected as a decoding target; and wherein said functions further comprise noticeably displaying the third identification mark superimposed on the image of a code pattern that has not been selected as a decoding target.

6. The computer readable recording medium according to claim 5, wherein the memory is configured to store a fourth identification mark indicating that a code pattern has not been successfully decoded; and wherein said functions further comprise noticeably displaying, based on the result of the decoding, the fourth identification mark superimposed on the image of a code pattern that has been selected as a decoding target and has not been successfully decoded.

* * * * *